US009204414B2

(12) United States Patent
Lee et al.

(10) Patent No.: US 9,204,414 B2
(45) Date of Patent: Dec. 1, 2015

(54) APPARATUS AND METHOD FOR UPDATING LOCATION OF IDLE-MODE MOBILE STATION IN A BROADBAND WIRELESS ACCESS COMMUNICATION SYSTEM

(75) Inventors: Kang-Gyu Lee, Yongin-si (KR); Yun-Sang Park, Suwon-si (KR); Sa-Jin Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1848 days.

(21) Appl. No.: 11/807,782

(22) Filed: May 30, 2007

(65) Prior Publication Data
US 2007/0293244 A1 Dec. 20, 2007

(30) Foreign Application Priority Data
May 30, 2006 (KR) .................. 10-2006-0048605

(51) Int. Cl.
*H04W 60/04* (2009.01)
*H04W 68/00* (2009.01)
*H04W 84/12* (2009.01)

(52) U.S. Cl.
CPC .............. *H04W 60/04* (2013.01); *H04W 68/00* (2013.01); *H04W 84/12* (2013.01)

(58) Field of Classification Search
CPC ..... H04W 60/04; H04W 84/12; H04W 68/00; H04W 68/02; H04W 68/025; H04W 68/0005; H04W 84/02; H04W 84/027; H04W 4/02; H04W 4/025; H04W 36/32; H04Q 7/34; H04Q 7/30; H04Q 7/32
USPC .......... 455/456.1, 456.2, 456.3, 456.4, 456.5, 455/456.6, 422.1; 709/220
See application file for complete search history.

(56) References Cited

U.S. PATENT DOCUMENTS

| 5,966,668 | A | 10/1999 | Lindroth |
| 6,671,514 | B1 | 12/2003 | Cedervall et al. |
| 7,092,722 | B1 | 8/2006 | Oh et al. |
| 2003/0050075 | A1 | 3/2003 | Rangarajan et al. |
| 2006/0206597 | A1* | 9/2006 | Kim et al. ..................... 709/220 |
| 2007/0218889 | A1* | 9/2007 | Zhang et al. ............... 455/422.1 |

FOREIGN PATENT DOCUMENTS

| KR | 1020060043540 | 5/2006 |
| RU | 2 191 477 | 10/2002 |

(Continued)

OTHER PUBLICATIONS

IEEE, IEEE Standard for Local and Metropolitan area networks Part 16: Air Interface for Fixed and Mobile Broadband Wireless Access Systems, Amendment 2: Physical and Meduim Access Control Layers for Combined Fixed and Mobile Operation in Licensed Bands and Corrigendum 1, IEEE, IEEE std 802.16e-2005 and IEEE Std 802.16/2004/Cor1-2005, Feb. 2006.*

(Continued)

*Primary Examiner* — Meless Zewdu
(74) *Attorney, Agent, or Firm* — The Farrell Law Firm, P.C.

(57) ABSTRACT

An apparatus and method for a Mobile Station (MS) in an idle mode for performing a location update in a broadband wireless access communication system is provided. The method includes transmitting a ranging request message requesting location update to a Base Station (BS) when a location update condition is met in idle mode, receiving a ranging response message including information for location update response from the BS, and wherein the information indicates whether a downlink traffic is pending for the MS.

20 Claims, 6 Drawing Sheets

(56) References Cited

FOREIGN PATENT DOCUMENTS

| | | |
|---|---|---|
| WO | WO 97/09833 | 3/1997 |
| WO | WO 98/21910 | 5/1998 |
| WO | WO 03/058985 | 7/2003 |
| WO | WO 2005/086379 | 9/2005 |
| WO | WO 2005/120181 | 12/2005 |

OTHER PUBLICATIONS

IEEE, IEEE Standard for Local and Metropolitan Area Networks Part 16: Air Interface for Fixed and Mobile Broadband Wireless Access Systems, Amemdment 2: Physical and Medium Access Control Layers for Combined Fixed and Mobile Operation in Licensed Bands and Corrigendum 1, IEEE, IEEE Std 802.16e-2004/Cor1-2005, Feb. 2006.*

IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Feb. 28, 2006.

* cited by examiner

APPARATUS AND METHOD FOR UPDATING LOCATION OF IDLE-MODE MOBILE STATION IN A BROADBAND WIRELESS ACCESS COMMUNICATION SYSTEM

PRIORITY

This application claims priority under 35 U.S.C. §119 to an application filed in the Korean Intellectual Property Office on May 30, 2006 and assigned Serial No. 2006-48605, the contents of which are incorporated herein by reference.

BACKGROUND OF THE INVENTION

1. Field of the Invention

The present invention relates generally to a Broadband Wireless Access (BWA) communication system, and in particular, to an apparatus and a method for fast processing downlink traffic that has been generated during a location update procedure in an idle-mode Mobile Station (MS).

2. Description of the Related Art

Provisioning of services with diverse Quality of Service (QoS) requirements at or above 100 Mbps to users is an active study area for a future-generation communication system called a $4^{th}$ Generation (4G) communication system. Particularly, active research is conducted on provisioning of high-speed service by ensuring mobility and QoS to a BWA communication system such as a Wireless Local Area Network (WLAN) and a Wireless Metropolitan Area Network (WMAN). Examples of such systems are Institute of Electrical and Electronics Engineers (IEEE) 802.16a and IEEE 802.16e systems.

According to the IEEE 802.16e standards, an idle-mode MS shall update its location, if any of a plurality of location update conditions is met. The IEEE 802.16e-2005 standard defines four location update conditions: Zone Update according to change of paging group, Timer Update, Power Down Update, and Medium Access Control (MAC) Hash Skip Threshold Update.

Before describing the location update conditions, it is to be clarified that Downlink Channel Descriptor (DCD), Uplink Channel Descriptor (UCD), Mobile Paging Advertisement (MOB_PAG-ADV), Paging Group Identifier (PG-ID), MAC Hash Skip Threshold, MAC Hash Skip Counter, Deregistration Command (DREG-CMD), Ranging Request (RNG-REQ), and Ranging Response (RNG-RSP) messages are in compliance with the IEEE 802.16e-2005 standard.

In Zone Update according to change of paging group, the MS performs a location update process when it detects a change in its paging group by comparing a PG-ID stored in the MS with a PG-ID included in a DCD or MOB_PAG-ADV message broadcasted by a preferred BS during a Paging Listening Interval (PLI) known to the MS. If the two PG-IDs are different, the MS determines that its paging group has been changed.

In Timer Update, the MS periodically performs the location update process prior to the expiration of an idle-mode timer. The idle-mode timer is set to 128 to 65536 seconds as defined in IEEE 802.16e-2005 Parameters and Constants.

In Power Down Update, the MS attempts a location update as part of its orderly power-down procedure. As the MS informs its power-down to a paging controller being a network entity that handles the idle mode of the MS, the paging controller deletes information about the MS.

In MAC Hash Skip Threshold Update, the MS performs the location update process if an MS MAC Hash Skip Counter exceeds a MAC Hash Skip Threshold. The MAC Hash Skip Threshold is known from a DREG-CMD message that the MS receives from a network in order to enter the idle mode. When the location update is successful, the MS and the BS need to initialize their MAC Hash Skip Counters.

A description will be made of FIG. 1, which is a flowchart illustrating a conventional location update process when a preferred BS is changed within the same paging group.

Referring to FIG. 1, a first BS 110 and a second BS 120 are in the same paging group. When the first BS 110 is a preferred BS, an MS 100 monitors occurrence of a location update event in idle mode in step 130. Upon occurrence of a location update event, the MS 100 updates its location with the first BS 110 in step 132 and proceeds to step 134. If a location update event does not occur in step 130, the MS 100 jumps to step 134. The MS receives a MOB_PAG-ADV message from the first BS 110 during a PLI in step 134. Steps 136 to 140 are the same as steps 130 to 134 except that the preferred BS has changed to the second BS 120.

As illustrated in FIG. 1, in the case where the preferred BS changes from the first BS 110 to the second BS 120, an analysis of the occurrence of a location update event in step 136 reveals that the two BSs 110 and 120 are in the same paging group. Hence the MS jumps from step 136 to step 140 without a location update.

FIG. 2 is a diagram illustrating a signal flow for a conventional Zone Update process.

Referring to FIG. 2, when detecting a change in its paging group, the MS 200 transmits an initial ranging/dedicated ranging Code Division Multiple Access (CDMA) Code (M20) to a preferred BS, herein the BS 220, according to valid DCD and UCD information received from the BS 220.

The BS 220 transmits Uplink BandWidth (UL BW) allocation information to the MS 200 by a RNG-RSP message with status=success (M21) and a CDMA-Allocation-IE message (M22) so that the MS 200 can transmit an uplink message.

The MS 200 transmits a RNG-REQ message with ranging purpose=0x02 (M23) according to the UL BW allocation information. That is, the MS 200 sets Value of a Ranging Purpose Indication Type, Length, Value (TLV) to indicate a location update request in the RNG-REQ message with ranging purpose=0x02 (M23).

The BS 220 replies with an RNG-RSP message with location update response (M24), i.e. including a Location Update Response (LUR) TLV indicating success. The BS 220 may include paging information such as a new paging cycle, a new paging offset, and a new PG-ID in the RNG-RSP message with location update response (M24).

Upon receipt of the RNG-RSP message with location update response (M24), the MS 200 determines whether the location update is successful in step 202. If the location update is successful, the MS 200 completes the location update process in step 204. If the location update has failed, the MS 200 performs network entry initialization in step 206.

FIG. 3 is a diagram illustrating a signal flow for a conventional process for processing pending downlink traffic transmission during the Zone Update. Steps (302~306) or messages (M20~M24) described with reference to FIGS. 1 and 2 will not be described herein.

Referring to FIG. 3, when detecting the change of the preferred BS from a first BS 310 to a second BS 320 in a different paging group in an idle mode, i.e., when a location update event occurs, the MS 300 and the second BS 320 exchange M20 to M24 messages as illustrated in FIG. 2. Upon receipt of a RNG-RSP message with location update response (M24), the MS 300 completes the location update in step 336.

Upon receipt of the RNG-RSP message with location update response (M24), the MS 300 also monitors a valid PLI from the second BS 320 using new paging information included in the RNG-RSP message with location update response (M24). Hence, the MS 300 can receive a MOB_PAG-ADV message (M30) indicating occurrence of downlink traffic in the valid PLI.

When detecting the presence of the downlink traffic, the MS 300 releases itself from the idle mode and performs network reentry in step 338.

A network cannot be aware of a paging group of the MS 300 until the MS 300 completes the location update. In this case, if there is downlink traffic for the MS 300, a downlink traffic transmission delay may occur due to the incapability of transmitting the downlink traffic to the MS 300. The MS 300 cannot determine the occurrence of the downlink traffic until receiving the MOB_PAG-ADV message (M30), despite the completion of the location update by the time of receiving the RNG-RSP message with location update response (M24).

A shortcoming with the above conventional location update process is that the MS does not know whether downlink traffic exists for the MS even after a successful location update. The MS knows the occurrence of the downlink traffic only when an updated PLI comes.

SUMMARY OF THE INVENTION

An aspect of the present invention is to substantially solve at least the above problems and/or disadvantages and to provide at least the advantages below. Accordingly, an aspect of the present invention is to provide an apparatus and method for updating the location of an idle-mode MS such that the delay of downlink traffic transmission is decreased in a BWA communication system.

Another aspect of the present invention is to provide an apparatus and method for reducing the delay of downlink traffic transmission during a location update by an idle-mode MS in a BWA communication system.

A further aspect of the present invention is to provide an apparatus and method for transmitting a location update response message indicating whether there is pending downlink traffic transmission for an MS that has requested a location update in a BWA communication system.

According to one aspect of the present invention, a location updating method in a broadband wireless access communication system includes receiving a ranging request message requesting a location update from an MS in idle mode, when a location update condition is met, determining whether downlink traffic exists for the MS, if the downlink traffic exists for the MS, generating a ranging response message including information indicating that there is downlink traffic pending for the MS and transmitting the ranging response message to the MS.

According to another aspect of the present invention, a method of an MS in idle mode for performing a location update in a broadband wireless access communication system includes transmitting a ranging request message requesting location update to a BS when a location update condition is met in an idle mode, and receiving a ranging response message including information for location update response from the BS, wherein the information indicates whether downlink traffic is pending for the MS.

According to yet another aspect of the present invention, a BS in a broadband wireless access communication system includes a transceiver for processing a Radio Frequency (RF) signal and baseband signal for communicating with an MS, a processing unit configured to perform a location update procedure when a ranging request message is received from an MS in the idle mode requesting location update, wherein the location update procedure includes determining whether downlink traffic exists for the MS, and generating a ranging response message including information indicating whether the downlink traffic is pending for the MS.

According to still another aspect of the present invention, an MS in a broadband wireless access communication system includes a transceiver for processing an RF signal and baseband signal for communicating with a BS and a processing unit configured to generate a ranging request message for requesting a location update when a location update condition is met in the idle mode, and to process a ranging response message received from the BS in response to the ranging request message to update the location, wherein the ranging response message includes information indicating whether there is downlink traffic pending for the MS.

According to still another aspect of the present invention, a broadband wireless access communication system includes at least one BS for receiving a ranging request message requesting location update from an MS in the idle mode when a location update condition is met, determining whether downlink traffic exists for the MS, generating a ranging response message including information indicating that there is downlink traffic pending for the MS if the downlink traffic exists for the MS, and transmitting the ranging response message to the MS and at least one MS for transmitting a ranging request message requesting location update to a BS when a location update condition is met in the idle mode, and receiving a ranging response message including information for a location update response from the BS, the information indicating whether the downlink traffic is pending.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for updating the location of an idle-mode MS so as to reduce the delay of downlink traffic directed to the MS, in particular to overcome the problem encountered with the present IEEE 802.16e standard in that an MS is not aware of the presence of downlink traffic until an updated PLI, in a BWA communication system.

Figure 1:
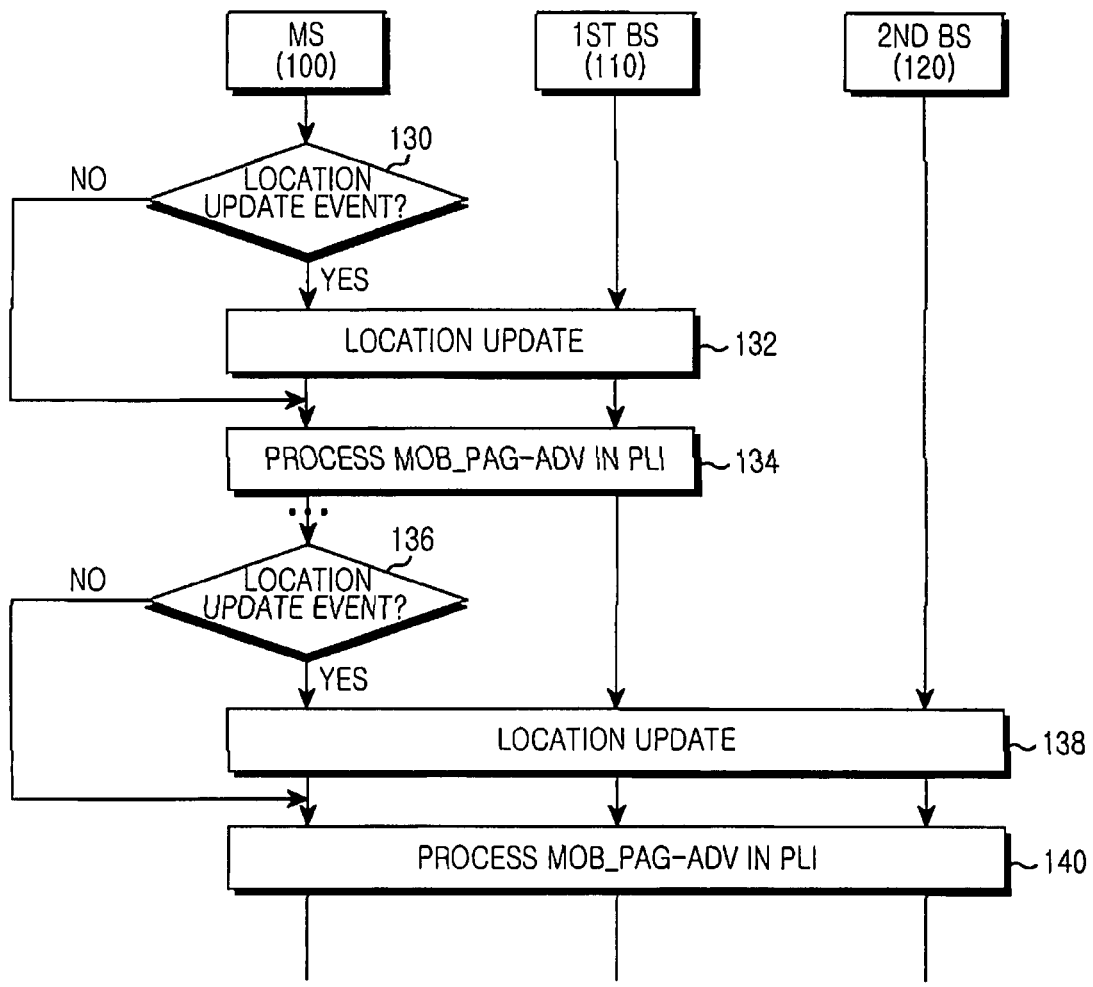
FIG. 1 is a flowchart illustrating a conventional location update process when a preferred BS is changed within the same paging group.
Figure 2:
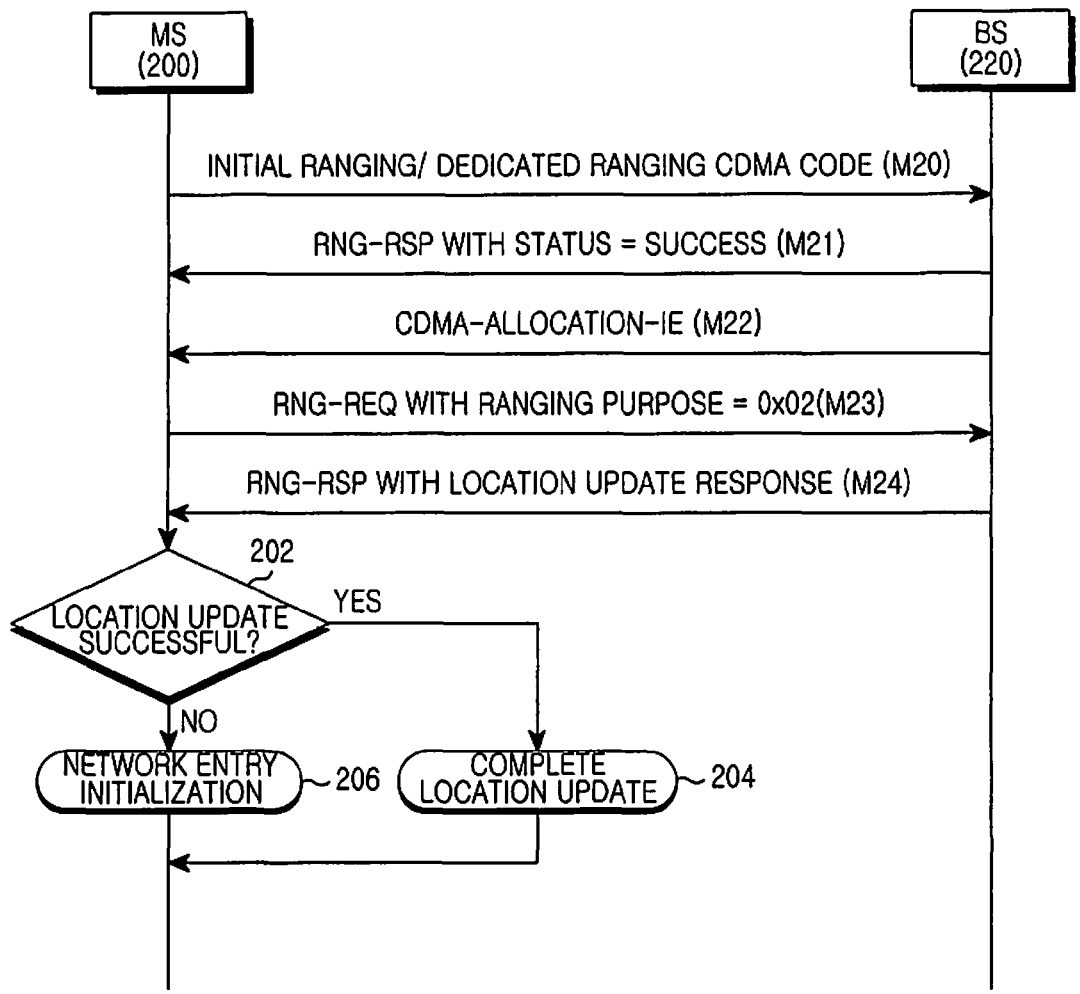
FIG. 2 is a diagram illustrating a signal flow for a conventional Zone Update process.
Figure 3:
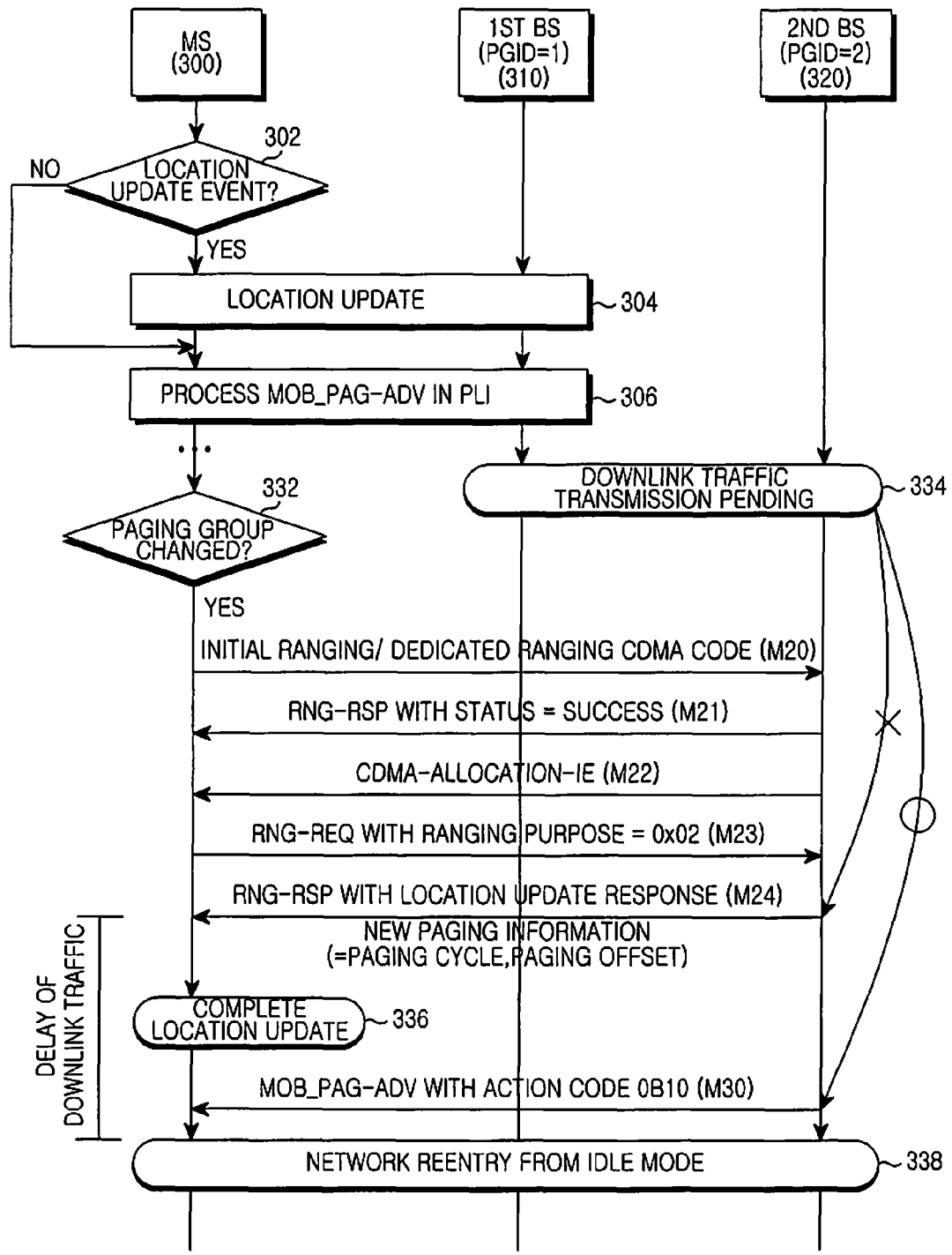
FIG. 3 is a diagram illustrating a signal flow for a conventional process for processing pending downlink traffic transmission during the Zone Update.
Figure 4:
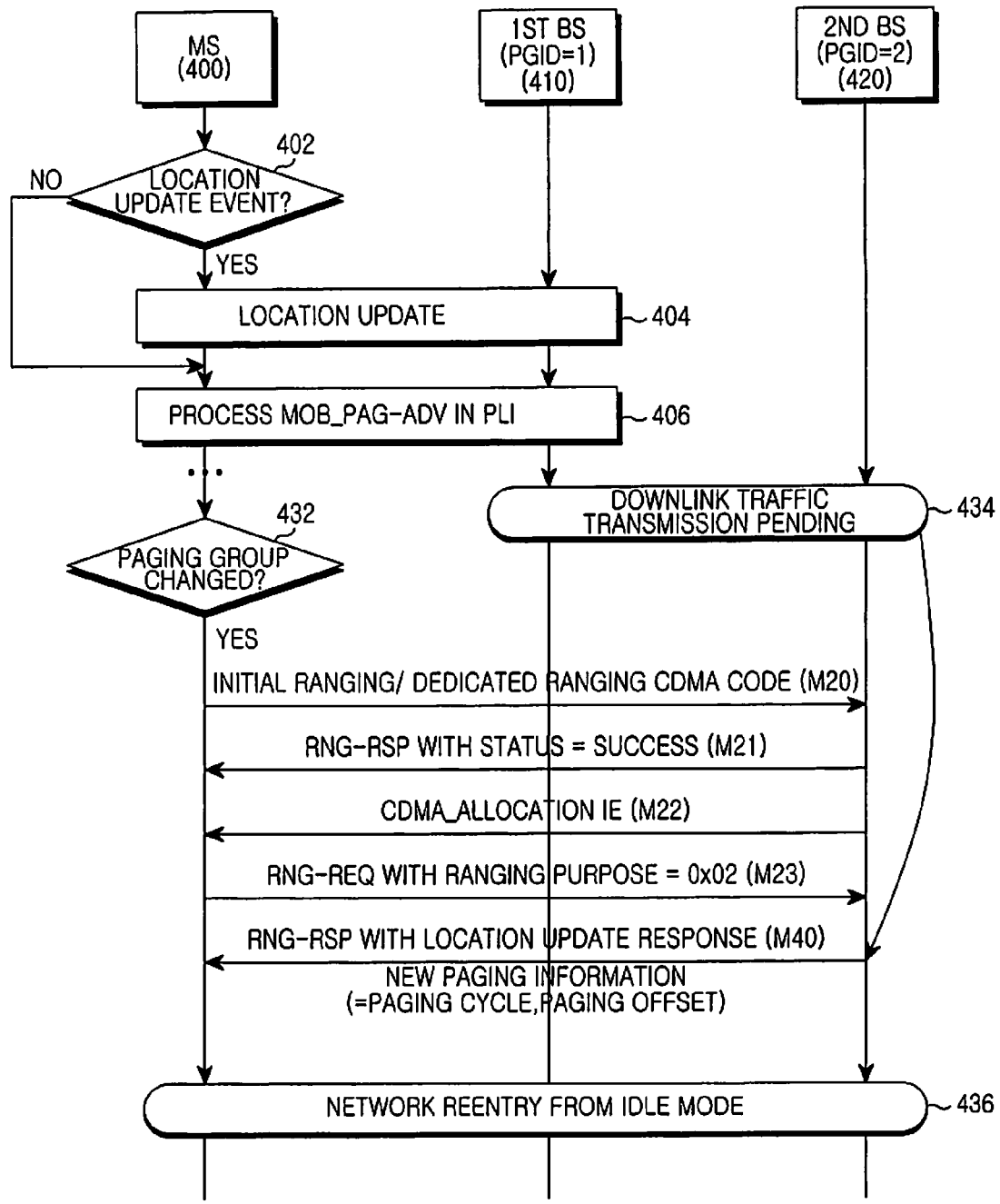
FIG. 4 is a diagram illustrating a signal flow for a process for processing pending downlink traffic transmission during a Zone Update in a BWA communication system according to the present invention.

FIG. 4 is a diagram illustrating a signal flow for a process for processing pending downlink traffic transmission during a Zone Update in a BWA communication system according to the present invention. A description of steps (402~406) or messages (M20~M23) described earlier with reference to FIGS. 1, 2 and 3 is not provided herein.

Referring to FIG. 4, when an MS 400 detects in an idle mode that a preferred BS has changed from a first BS 410 to a second BS 420 in a different paging group in step 432, the MS 400 transmits an initial ranging/dedicated ranging CDMA Code (M20) to the second BS 420. The BS 420 transmits a RNG-RSP message with status=success (M21) and a CDMA-Allocation-IE message (M22) to the MS 400. Then the MS 400 transmits a RNG-REQ message with ranging purpose=0x02 (M23) to the second BS 420.

Hereafter, the second BS 420 determines that there is downlink traffic pending transmission for the MS 400 in step 434 and the second BS 420 transmits a RNG-RSP message with location update response (M40) to the MS 400. The RNG-RSP message with location update response (M40) contains new paging information and information indicating the presence of the downlink traffic.

As the MS 400 is aware of the pending downlink traffic transmission by the RNG-RSP message with location update response (M40), it completes the location update process and performs network reentry from the idle mode in step 436.

The RNG-RSP message with location update response (M40) includes an LUR TLV configured as shown in Table 1 below.

TABLE 1

| Type | Length | Value |
|---|---|---|
| LUR | 23 | 1 | 0x00 = Failure of Location Update. The MS shall perform Network Reentry from Idle Mode<br>0x01 = Success of Location Update<br>0x02 = Success of Location Update and presence of DL traffic pending<br>0x03~0xFF = Reserved |

In Table 1, the TLV values other than a Value of 0x02 are in compliance with the IEEE 802.16e-2005 standard.

Figure 5:
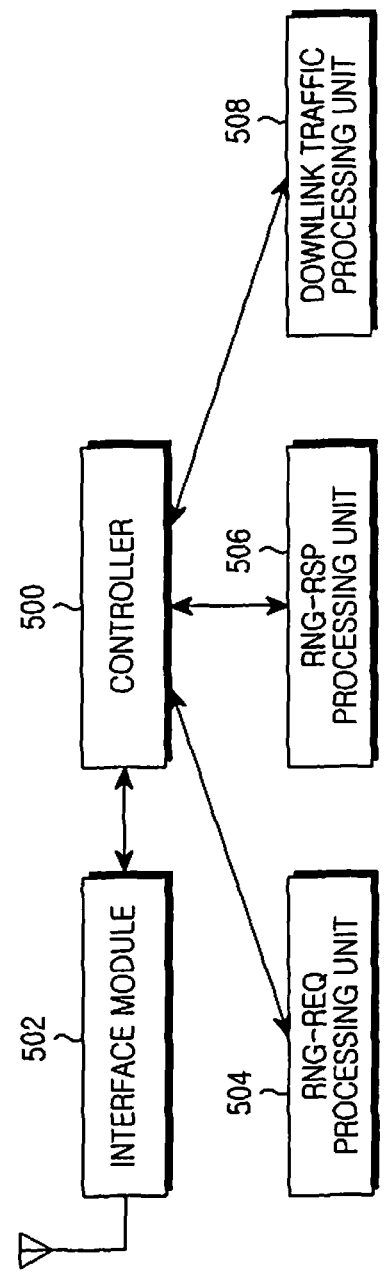
FIG. 5 is a block diagram of a BS in the BWA communication system according to the present invention.

FIG. 5 is a block diagram of a BS in the BWA communication system according to the present invention. Referring to FIG. 5, the BS includes a controller 500, an interface module 502, a RNG-REQ processing unit 504, a RNG-RSP processing unit 506, and a downlink traffic processing unit 508.

The interface module 502 is a module for communicating with an MS, including a Radio Frequency (RF) processing unit and a baseband processing unit. The RF processing unit downconverts an RF signal received through an antenna to a baseband signal and provides the baseband signal to the baseband processing unit. It also upconverts a baseband signal received from the baseband processing unit to an RF signal transmittable over air and transmits the RF signal through the antenna. In BWA, for example, the baseband processing unit processes an RF signal received from the RF processing unit by Fast Fourier Transform (FFT) and channel decoding and provides the original information data to the controller 500. In the reverse order, the baseband processing unit processes data received from the controller 500 by channel encoding and Inverse Fast Fourier Transform (IFFT) and provides the processed data to the RF processing unit.

The RNG-REQ processing unit 504 processes a RNG-REQ message with ranging purpose=0x02 (M23) received from the idle-mode MS 400. It identifies whether the ranging purpose of the RNG-REQ message with ranging purpose=0x02 (M23) is for location update, initial ranging, or network entry and operates correspondingly. If the RNG-REQ message with ranging purpose=0x02 (M23) includes the ID of the MS 400 and Ranging Purpose Indication Bit#1=1, the RNG-REQ processing unit 504 considers that the RNG-REQ message with ranging purpose=0x02 (M23) requests a location update.

The downlink traffic processing unit 508 operates after the location update requested by the MS 400 is performed. If the location update is successful, the downlink traffic processing unit 508 monitors occurrence of downlink traffic for the MS 400 and provides the monitoring result to the RNG-RSP processing unit 506.

The RNG-RSP processing unit 506 generates a RNG-RSP message with location update response (M40) with an LUR TLV parameter configured as shown in Table 1 according to whether the location update is successful and whether there is pending downlink traffic transmission from operations of the RNG-REQ processing unit 504 and the downlink traffic processing unit 508.

The controller 500 controls the interface module 502, the RNG-REQ processing unit 504, the RNG-RSP processing unit 506, and the downlink traffic processing unit 508. That is, the controller 500 can implement the functionalities of the interface module 502, the RNG-REQ processing unit 504, the RNG-RSP processing unit 506, and the downlink traffic processing unit 508. While the interface module 502, the RNG-REQ processing unit 504, the RNG-RSP processing unit 506, and the downlink traffic processing unit 508 are shown separately for illustrative purposes, all or part of them may be incorporated into the controller 500 in real implementation.

Figure 6:
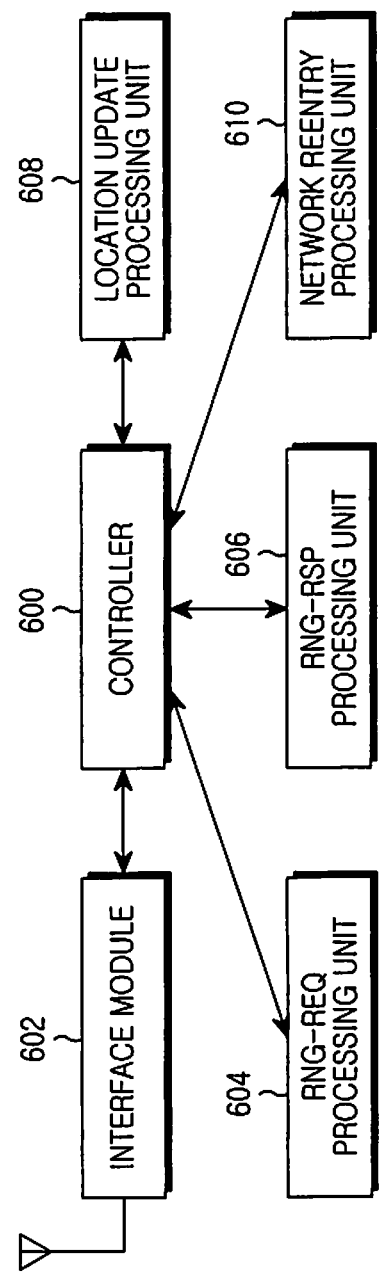
FIG. 6 is a block diagram of an MS in the BWA communication system according to the present invention.

FIG. 6 is a block diagram of an MS in the BWA communication system according to the present invention. Referring to FIG. 6, the MS includes a controller 600, an interface module 602, a RNG-REQ processing unit 604, a RNG-RSP processing unit 606, a location update processing unit 608, and a network reentry processing unit 610.

The interface module 602 is a module for communicating with the BS, including an RF processing unit and a baseband processing unit. The RF processing unit downconverts an RF signal received through an antenna to a baseband signal and provides the baseband signal to the baseband processing unit. It also upconverts a baseband signal received from the baseband processing unit to an RF signal transmittable over air and transmits the RF signal through the antenna. In BWA, for example, the baseband processing unit processes an RF signal received from the RF processing unit by FFT and channel decoding and provides the original information data to the controller 600. In the reverse order, the baseband processing unit processes data received from the controller 600 by channel encoding and IFFT and provides the processed data to the RF processing unit.

The RNG-REQ processing unit 604 generates a RNG-REQ message with ranging purpose=0x02 (M23) for a location update when any of location update conditions is met in an idle mode. The RNG-REQ message with ranging purpose=0x02 (M23), having the_ranging purpose of location update includes the ID of the MS (herein, the MS 400) and Ranging Purpose Indication Bit#1=1.

The RNG-RSP processing unit 606 processes a RNG-RSP message with location update response (M40) received from the BS 420 to perform location update for the MS 400 in the idle mode. The RNG-RSP processing unit 606 provides location update information according to an LUR TLV value to the location update processing unit 608 and informs the network reentry processing unit 610 whether there is pending downlink traffic transmission according to the LUR TLV value. Herein, the location update information can be new paging information with a new paging cycle, a new paging offset, and a new PG ID.

The location update processing unit 608 updates a PLI using the new paging cycle and the new paging offset, and stores the new PG-ID according to the new paging information provided from the RNG-RSP processing unit 606.

The network reentry processing unit 610 attempts network reentry to the BS 420, being the preferred BS, when the RNG-RSP processing unit 606 indicates that there is pending downlink traffic transmission.

The controller 600 controls the interface module 602, the RNG-REQ processing unit 604, the RNG-RSP processing unit 606, the location update processing unit 608, and the network reentry processing unit 610. That is, the controller 600 can implement the functionalities of the interface module 602, the RNG-REQ processing unit 604, the RNG-RSP processing unit 606, the location update processing unit 608, and the network reentry processing unit 610. While the interface module 602, the RNG-REQ processing unit 604, the RNG-RSP processing unit 606, the location update processing unit 608, and the network reentry processing unit 610 are shown separately for illustrative purposes, all or part of them may be incorporated into the controller 600 in real implementation.

As described above, the present invention provides a location updating apparatus and method in which a BS determines the presence or absence of downlink traffic for an MS and transmits a RNG-RSP message indicating the presence or absence of downlink traffic to the MS during a location update of the MS in an idle mode. Therefore, the delay of downlink traffic transmission is reduced without using additional resources during the location update.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of a Base Station (BS) in a broadband wireless access communication system, comprising:
    receiving a ranging request message requesting location update from a Mobile Station (MS) in an idle mode, when a location update condition is met;
    determining whether downlink traffic exists for the MS in the idle mode;
    if downlink traffic exists for the MS, generating a ranging response message including information indicating that there is downlink traffic pending for the MS in the idle mode and that the location update is successful, and supporting performance of a network re-entry of the MS for receiving downlink data without waiting for a Paging Listening Interval (PLI) when the downlink traffic is pending for the MS in the idle mode; and
    transmitting the ranging response message to the MS.

2. The method of claim 1, wherein the information included in the ranging response message is a Location Update Response (LUR) Type, Length, Value (TLV).

3. The method of claim 2, wherein the LUR TLV includes a value which indicates any one of a failure of location update, a success of location update, and a presence of downlink traffic pending, and reserved.

4. The method of claim 1, wherein the ranging request message includes an identification of the MS and a field indicating the request for a location update.

5. A method of a Mobile Station (MS) in an idle mode for performing a location update in a broadband wireless access communication system, comprising:
    transmitting a ranging request message requesting location update to a Base Station (BS) when a location update condition is met in the idle mode;
    receiving a ranging response message including information for location update response from the BS, wherein the information indicates whether downlink traffic is pending for the MS in the idle mode and the location update is successful; and
    performing a network re-entry for receiving downlink data without waiting for a Paging Listening Interval (PLI) when the downlink traffic is pending for the MS in the idle mode.

6. The method of claim 5, wherein the information included in the ranging response message is a Location Update Response (LUR) Type, Length, Value (TLV).

7. The method of claim 6, wherein the LUR TLV includes a value which indicates any one of a failure of location update, a success of location update, and a presence of downlink traffic pending, and reserved.

8. The method of claim 5, wherein the ranging request message includes an identification of the MS and a field indicating the request for a location update.

9. A Base Station (BS) in a broadband wireless access communication system, comprising:
    a transceiver for processing a Radio Frequency (RF) signal and a baseband signal for communicating with a Mobile Station (MS);
    a processing unit configured to perform a location update procedure when a ranging request message is received from the MS in an idle mode requesting location update, wherein the location update procedure includes determining whether downlink traffic exists for the MS in the idle mode, and generating a ranging response message including information indicating whether the downlink traffic is pending for the MS in the idle mode and the location update is successful, and supporting performance of a network re-entry of the MS for receiving the downlink traffic without waiting for a Paging Listening Interval (PLI) when the downlink traffic is pending for the MS in the idle mode, and to transmit the ranging response message to the MS.

10. The BS of claim 9, wherein the information included in the ranging response message is a Location Update Response (LUR) Type, Length, Value (TLV).

11. The BS of claim 10, wherein the LUR TLV includes a value which indicates any one of a failure of location update, a success of location update, and a presence of downlink traffic pending, and reserved.

12. The BS of claim 9, wherein the ranging request message includes an identification of the MS and a field indicating request for a location update.

13. A Mobile Station (MS) in a broadband wireless access communication system, comprising:
    a transceiver processing a Radio Frequency (RF) signal and a baseband signal for communicating with a Base Station (BS); and
    a processing unit configured to generate a ranging request message for requesting a location update when a location update condition is met in an idle mode, and to process a ranging response message received from the BS in response to the ranging request message to update the location, wherein the ranging response message includes information indicating whether there is downlink traffic pending for the MS in the idle mode and the location update is successful, and wherein the processing unit is configured to perform a network re-entry for receiving the downlink traffic without waiting for a Paging Listening Interval (PLI) when the downlink traffic is pending for the MS in the idle mode.

14. The MS of claim 13, wherein the information included in the ranging response message is a Location Update Response (LUR) Type, Length, Value (TLV).

15. The MS of claim 14, wherein the LUR TLV includes a value that indicates any one of a failure of location update, a success of location update, and a presence of downlink traffic pending, and reserved.

16. The MS of claim 13, wherein the ranging request message includes an identification of the MS and a field indicating request for a location update.

17. A broadband wireless access communication system, comprising:
a Base Station (BS) for receiving a ranging request message requesting location update from a Mobile Station (MS) in an idle mode when a location update condition is met, determining whether downlink traffic exists for the MS in the idle mode, generating a ranging response message including information indicating there is the downlink traffic pending for the MS in the idle mode and the location update is successful if the downlink traffic exists for the MS in the idle mode, supporting performance of a network re-entry of the MS for receiving downlink data without waiting for a Paging Listening Interval (PLI) when the downlink traffic is pending for the MS in the idle mode, and transmitting the ranging response message to the MS; and the MS for transmitting the ranging request message requesting the location update to the BS when the location update condition is met in the idle mode, receiving the ranging response message from the BS, and performing the network re-entry for receiving the downlink data without waiting for the PLI when the downlink traffic is pending for the MS in the idle mode.

18. The system of claim 17, wherein the information included in the ranging response message is a Location Update Response (LUR) Type, Length, Value (TLV).

19. The system of claim 18, wherein the LUR TLV includes a value which indicates any one of a failure of location update, a success of location update, and a presence of downlink traffic pending, and reserved.

20. The system of claim 18, wherein the ranging request message includes an identification of the MS and a field indicating the request for a location update.

\* \* \* \* \*